(12) United States Patent
Chen et al.

(10) Patent No.: US 11,104,796 B2
(45) Date of Patent: Aug. 31, 2021

(54) POLYCARBONATE COMPOSITIONS FOR MOBILE PHONE HOUSING APPLICATIONS

(71) Applicant: SABIC GLOBAL TECHNOLOGIES B.V., Bergen Op Zoom (NL)

(72) Inventors: Yagang Chen, Shanghai (CN); Wei Shan, Shanghai (CN); Shijie Song, Shanghai (CN); Yaming Niu, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 258 days.

(21) Appl. No.: 16/413,866

(22) Filed: May 16, 2019

(65) Prior Publication Data

US 2019/0352497 A1    Nov. 21, 2019

(30) Foreign Application Priority Data

May 21, 2018 (EP) .................................. 18173389
Apr. 11, 2019 (EP) .................................. 19168717

(51) Int. Cl.
| | | |
|---|---|---|
| *C08L 69/00* | (2006.01) | |
| *B29C 45/00* | (2006.01) | |
| *B29C 45/14* | (2006.01) | |
| *B29K 69/00* | (2006.01) | |

(52) U.S. Cl.
CPC .......... *C08L 69/00* (2013.01); *B29C 45/0001* (2013.01); *B29C 45/14688* (2013.01); *B29K 2069/00* (2013.01); *C08L 2201/02* (2013.01); *C08L 2203/20* (2013.01); *C08L 2205/025* (2013.01); *C08L 2205/035* (2013.01); *C08L 2207/324* (2013.01)

(58) Field of Classification Search
None
See application file for complete search history.

(56) References Cited

U.S. PATENT DOCUMENTS

| | | |
|---|---|---|
| 7,553,895 B2 | 6/2009 | An et al. |
| 7,615,594 B2 | 11/2009 | Hashimoto et al. |
| 7,632,881 B2 | 12/2009 | Chen et al. |
| 8,691,902 B2 | 4/2014 | Grcev et al. |
| 8,816,019 B2 | 8/2014 | Ganguly et al. |
| 8,829,091 B2 | 9/2014 | Ha et al. |
| 9,034,959 B2 | 5/2015 | Chin et al. |
| 9,127,155 B2 | 9/2015 | Subramanian et al. |
| 9,394,483 B2 | 7/2016 | Wu et al. |
| 2006/0030647 A1 | 2/2006 | Ebeling et al. |
| 2006/0142486 A1 | 6/2006 | Derudder et al. |
| 2006/0205848 A1 | 9/2006 | Siripurapu et al. |
| 2007/0060716 A1 | 3/2007 | Ambravaneswaran et al. |
| 2007/0293608 A1 | 12/2007 | Chen et al. |
| 2009/0088514 A1 | 4/2009 | Shiping |
| 2010/0159211 A1* | 6/2010 | Blackburn .............. B32B 27/08 428/195.1 |
| 2013/0313493 A1 | 11/2013 | Wen et al. |
| 2014/0179843 A1 | 6/2014 | Van Der Mee et al. |

FOREIGN PATENT DOCUMENTS

| | | |
|---|---|---|
| WO | 2007149663 A1 | 12/2007 |
| WO | 2013175448 A1 | 11/2013 |
| WO | 2014072923 A1 | 5/2014 |
| WO | 2016174592 A1 | 11/2016 |

OTHER PUBLICATIONS

European Search Report for European Application No. 18173389.0 dated Aug. 21, 2018, 7 pages.
European Search Report for European Application No. 19168717.7 dated Jun. 11, 2019, 8 pages.
Silicone-based Flame Retardant for Polycarbonate, ANTEC, 2009, pp. 1351-1354.

* cited by examiner

*Primary Examiner* — Robert T Butcher
(74) *Attorney, Agent, or Firm* — Cantor Colburn LLP

(57) ABSTRACT

A polycarbonate composition contains, based on the total weight of the polycarbonate composition: one or more polycarbonate homopolymers; a poly(carbonate-siloxane) copolymer comprising siloxane units with an average block length of 5 to 120, preferably 10 to 100, the poly(carbonate-siloxane) copolymer being present in an amount effective to provide 2.5 to 10 wt % of siloxane units based on the total weight of the polycarbonate composition; 1 to 8 wt % of an elastomer-modified graft copolymer; 0.01 to 5 wt % of a silicone oil; and 0.1 to 8 wt % of an additive; and wherein the composition has a melt mass flow rate higher than 16 g/10 min, determined in accordance with ASTM D1238 under a load of 1.2 kg at 300° C. with a dwelling time of 300 seconds; and an Izod notched impact energy of at least 700 J/m measured at 23° C. on a sample of 3.2 mm thickness according to ASTM D256-10.

20 Claims, No Drawings

POLYCARBONATE COMPOSITIONS FOR MOBILE PHONE HOUSING APPLICATIONS

CROSS REFERENCE TO RELATED APPLICATIONS

This application claims priority to EP 18173389.0 filed May 21, 2018 and EP 19168717.7 filed Apr. 11, 2019, the contents of both of which are incorporated herein by reference in their entirety.

BACKGROUND

This disclosure relates to polycarbonate compositions, and in particular to polycarbonate compositions for mobile phone applications, methods of manufacture, and uses thereof.

Polycarbonates are useful in the manufacture of articles and components for a wide range of applications, from automotive parts to electronic appliances. Despite extensive research on these materials over the years, there still remains a need in the art for improved polycarbonate compositions that meet increasingly stringent industry standards for consumer electronics. For example, current design trends for mobile phones require use of insert mold decoration or in-mold-decoration (IMD) processes. Part thickness for these devices has evolved from about 1.5 to 2.0 mm down to 0.8 to 1.2 mm, and even as thin as 0.5 mm. Thin parts not only require high flow but also high impact from the material used. In addition, in an IMD process, since the carrier for the decorative ink pattern itself cannot withstand very high temperatures, materials moldable at lower injection molding temperatures are preferred, to prevent ink washout.

Polycarbonates alone provide high impact strength, but these polycarbonates may need to be processed at a temperature that is higher than desirable for certain IMD processes. High flow polycarbonates are available, but may have insufficient impact strength required by thin wall products. Thus there is a need in the art for optimized polycarbonate compositions with properties such as high flow and good impact resistance. It would be a further advantage if such materials can be used to manufacture thin wall products having good aesthetics.

SUMMARY

A polycarbonate composition comprises, based on the total weight of the polycarbonate composition: one or more polycarbonate homopolymers; a poly(carbonate-siloxane) copolymer comprising siloxane units with an average block length of 5 to 120, preferably 10 to 100, the poly(carbonate-siloxane) copolymer being present in an amount effective to provide 2.5 to 10 wt %, preferably 2.5 to 5 wt % of siloxane units based on the total weight of the polycarbonate composition; 1 to 8 wt % of an elastomer-modified graft copolymer comprising the elastomer-modifier graft copolymer comprises a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, and methyl methacrylate-butadiene-styrene, a silicone graft copolymer, or a combination comprising at least one of the foregoing; 0.01 to 5 wt % of a silicone oil comprising a polydialkylsiloxane, a polydiphenylsiloxane, a poly(alkylphenyl siloxane), a copolymer thereof, or a combination comprising at least one of the foregoing; and 0.1 to 8 wt % of an additive comprising a processing aid, a heat stabilizer, an antioxidant, an ultraviolet light absorber, a flame retardant, an anti-drip agent, or a combination comprising at least one of the foregoing; and wherein the composition has a melt mass flow rate higher than 16 g/10 min, determined in accordance with ASTM D1238 under a load of 1.2 kg at 300° C. with a dwelling time of 300 seconds; and an Izod notched impact energy of at least 700 J/m measured at 23° C. on a sample of 3.2 mm thickness according to ASTM D256-10.

In another embodiment, a molded article, comprises: a decorative film bonded to an injection molded base structure, the injection molded base structure comprising the above-described polycarbonate composition.

In yet another embodiment, a method of manufacture of an article comprises placing a decorative film into a mold; injecting the above-described polycarbonate composition into a mold cavity space behind the decorative film to form a single molded article comprising the decorative film and an injection molded base structure comprising the polycarbonate composition.

The above described and other features are exemplified by the following Detailed Description and Examples.

DETAILED DESCRIPTION

The inventors hereof have discovered that polycarbonate compositions having a balanced flow and impact properties can be obtained by combining a polycarbonate homopolymer with a poly(carbonate-siloxane) copolymer comprising siloxane units with an average block length of 5 to 120, preferably 10 to 100, an elastomer-modified graft copolymer, and a silicone oil. The polycarbonate compositions can advantageously be used in consumer electronic applications such as mobile phone housing applications.

The individual components of the compositions are described in more detail below.

The polycarbonates have repeating carbonate units of formula (1)

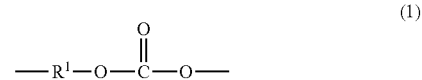

wherein at least 60 percent of the total number of $R^1$ groups are aromatic, or each $R^1$ contains at least one $C_{6-30}$ aromatic group. A combination of different $R^1$ groups can be present. The carbonate units can be derived from a dihydroxy aromatic compound such as a bisphenol of formula (2) or a diphenol of formula (3)

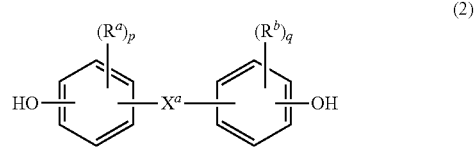

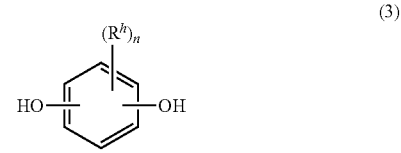

wherein in formula (2) $R^a$ and $R^b$ are each independently $C_{1-12}$ alkyl, $C_{2-12}$ alkenyl, $C_{3-8}$ cycloalkyl, or $C_{1-12}$ alkoxy, p and q are each independently 0 to 4, and $X^a$ is a single bond, —O—, —S—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, or a group of the formula —C(=$R^e$)— wherein $R^e$ is a divalent $C_{1-10}$ hydrocarbon group; and in formula (3), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In some embodiments in formulas (2) and (3), $R^a$ and $R^b$ are each independently $C_{1-3}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl, each $R^h$ is independently bromine, a $C_{1-3}$ alkyl, a halogen-substituted $C_{1-3}$ alkyl, and n is 0 to 1.

Examples of bisphenol compounds (2) include (2,2-bis (4-hydroxyphenyl)propane (bisphenol A or BPA), 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane (spirobiindane bisphenol), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole. A combination comprising different bisphenol compounds can be used.

Examples of diphenol compounds (3) included resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like. A combination comprising different diphenol compounds can be used.

In preferred embodiments, the polycarbonates are bisphenol homopolymers or copolymers having bisphenol carbonate units of formula (Ia)

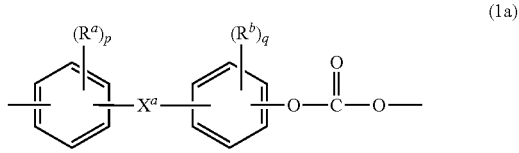

(1a)

wherein $R^a$, $R^b$, $X^a$, p, and q are the same as those defined in formula (2).

In an embodiment of formula (1a), $R^a$ and $R^b$ are each independently $C_{1-6}$ alkyl or $C_{1-3}$ alkoxy, p and q are each independently 0 to 1, and $X^a$ is a single bond, —O—, —S(O)—, —S(O)$_2$—, —C(O)—, a $C_{1-11}$ alkylidene of formula —C($R^c$)($R^d$)— wherein $R^c$ and $R^d$ are each independently hydrogen or $C_{1-10}$ alkyl.

In another embodiment, bisphenol homopolymers or copolymers containing carbonate units (1a) are derived from the specific bisphenols named above. In still another embodiment, bisphenol homopolymers containing carbonate units (1a) are derived from BPA, 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone), or a combination comprising at least one of the foregoing bisphenol compounds.

In a specific embodiment the bisphenol polycarbonate is a bisphenol A polycarbonate homopolymer, also referred to as bisphenol A homopolycarbonate, which has repeating structural carbonate units of formula (1b).

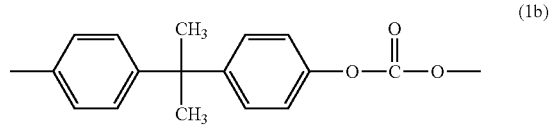

(1b)

The bisphenol polycarbonates and bisphenol A homopolycarbonate can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumylphenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Phenol and para-cumylphenol are specifically mentioned. Combinations of different end-capping agents can be used.

Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Combinations comprising linear polycarbonates and branched polycarbonates can be used.

In an embodiment, the bisphenol A homopolycarbonate is a linear bisphenol A homopolycarbonate having a weight average molecular weight of 10,000 to 100,000 Daltons (Da), or 15,000 to 50,000 Da, or 17,000 to 35,000 Da, as measured by gel permeation chromatography (GPC), using a crosslinked styrene-divinylbenzene column and calibrated to bisphenol A polycarbonate references. GPC samples are prepared at a concentration of 1 mg per ml, and are eluted at a flow rate of 1.5 ml per minute.

More than one bisphenol A homopolycarbonate can be present. For example, the polycarbonate compositions can comprise a first bisphenol A homopolycarbonate having a weight average molecular weight of 15,000 to 25,000 Da or 17,000 to 23,000 Da or 18,000 to 22,000 Da as measured by GPC using bisphenol A polycarbonate standards and a second bisphenol A homopolycarbonate having a weight average molecular weight of 26,000 to 40,000 Da or 26,000 to 35,000 Da, each measured by GPC using bisphenol A polycarbonate standards. The weight ratio of the first bisphenol A homopolycarbonate relative to the second bisphenol A homopolycarbonate can be 10:1 to 1:10, or 5:1 to 1:5, or 3:1 to 1:3, or 2:1 to 1:2. In an embodiment, the polycarbonate compositions comprise 50 to 85 wt %, 65 to 85 wt %, 65 to 76 wt %, or 75 to 85% of one or more bisphenol A polycarbonate homopolymers based on the total weight of the polycarbonate compositions.

The compositions further comprise a poly(carbonate-siloxane), also known as a polycarbonate-polysiloxane copolymer. The poly(carbonate-siloxane) comprises carbonate units and siloxane units. The carbonate units are as described above in formulas (1), (1a), and (1b) or are derived from bisphenols of formulas (2) and (3).

In preferred embodiments the carbonate units can be bisphenol carbonate units derived from bisphenols of formula (2). In a specific embodiment, the carbonate units are of formula (1b), which are derived from BPA.

The siloxane units (also referred to as polysiloxane blocks) are optionally of formula (4)

wherein each R is independently a $C_{1-13}$ monovalent organic group. For example, R can be a $C_{1-13}$ alkyl, $C_{1-13}$ alkoxy, $C_{2-13}$ alkenyl, $C_{2-13}$ alkenyloxy, $C_{3-6}$ cycloalkyl, $C_{3-6}$ cycloalkoxy, $C_{6-14}$ aryl, $C_{6-10}$ aryloxy, $C_{7-13}$ arylalkylene, $C_{7-13}$ arylalkylenoxy, $C_{7-13}$ alkylarylene, or $C_{7-13}$ alkylarylenoxy. The foregoing groups can be fully or partially halogenated with fluorine, chlorine, bromine, or iodine, or a combination thereof. Combinations of the foregoing R groups can be used in the same copolymer.

In an embodiment, R is a $C_{1-3}$ alkyl, $C_{1-3}$ alkoxy, $C_{3-6}$ cycloalkyl, $C_{3-6}$ cycloalkoxy, $C_{6-14}$ aryl, $C_{6-10}$ aryloxy, $C_7$ arylalkylene, $C_7$ arylalkylenoxy, $C_7$ alkylarylene, or $C_7$ alkylarylenoxy. In still another embodiment, R is methyl, trifluoromethyl, or phenyl.

The value of E in formula (4) can vary widely depending on the type and relative amount of each component in the polycarbonate composition, the desired properties of the composition, and like considerations. Generally, E has an average value of 5 to 120, 10 to 100, or 30 to 100, preferably 30 to 60, more preferably 30 to 50, or 40 to 50. As used herein, the average value of E can also be referred to as the average block length of siloxane units (E) of poly(carbonate-siloxane) copolymer, and the average means number average.

In an embodiment, the siloxane units are of formula (5)

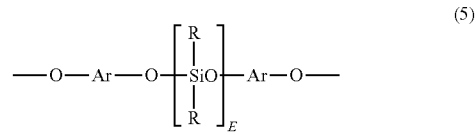

wherein E is as defined above in the context of formula (4); each R can be the same or different, and is as defined above in the context of formula (4); and Ar can be the same or different, and is a substituted or unsubstituted $C_{6-30}$ arylene, wherein the bonds are directly connected to an aromatic moiety. Ar groups in formula (5) can be derived from a $C_{6-30}$ dihydroxyarylene compound, for example a dihydroxy compound of formula (3). Exemplary dihydroxyarylene compounds are 1,1-bis(4-hydroxyphenyl) methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl) cyclohexane, bis(4-hydroxyphenyl sulfide), and 1,1-bis(4-hydroxy-t-butylphenyl) propane. Combinations comprising at least one of the foregoing dihydroxy compounds can also be used.

Specific examples of siloxane units of formula (5) include those of the formulas (5a) and (5b).

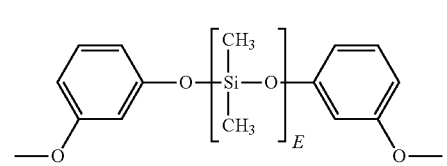

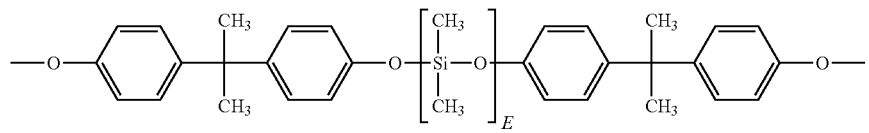
(5b)

In another embodiment, the siloxane units are of formula (6)

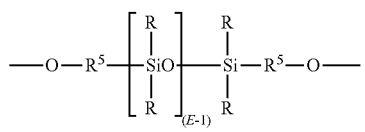
(6)

wherein R and E are as described above in the context of formula (4), and each $R^5$ is independently a divalent $C_1$-$C_{30}$ organic group, and wherein the polymerized polysiloxane unit is the reaction residue of its corresponding dihydroxy compound. In a specific embodiment, the poldiorganosiloxane blocks are of formula (7):

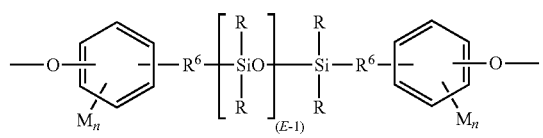
(7)

wherein R and E are as defined above in the context of formula (4). $R^6$ in formula (7) is a divalent $C_{2-8}$ aliphatic. Each M in formula (7) can be the same or different, and can be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ arylalkylenoxy, $C_{7-12}$ alkylarylene, or $C_{7-12}$ alkylarylenoxy, wherein each n is independently 0, 1, 2, 3, or 4.

In an embodiment, M is bromo or chloro, an alkyl such as methyl, ethyl, or propyl, an alkoxy such as methoxy, ethoxy, or propoxy, or an aryl such as phenyl, chlorophenyl, or tolyl; $R^6$ is a dimethylene, trimethylene or tetramethylene; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, R is methyl, M is methoxy, n is one, and $R^6$ is a divalent $C_{1-3}$ aliphatic group. Specific polydiorganosiloxane blocks are of the formula

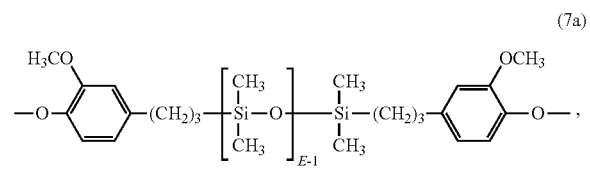
(7a)

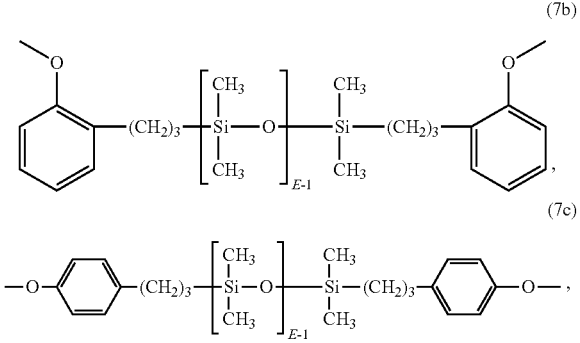

(7b)

(7c)

or a combination comprising at least one of the foregoing, wherein E has an average value of 5 to 120, 10 to 100, or 30 to 100, preferably 30 to 60, more preferably 30 to 50, or 40 to 50.

Blocks of formula (7) can be derived from the corresponding dihydroxy polydiorganosiloxane of formula (8), (8)

which in turn can be prepared effecting a platinum-catalyzed addition between the siloxane hydride and an aliphatically unsaturated monohydric phenol such as eugenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol.

The poly(carbonate-siloxane) can be manufactured by introducing phosgene under interfacial reaction conditions into a mixture of bisphenol and an end capped polydimethylsiloxane. Other known methods can also be used.

In an embodiment, the poly(carbonate-siloxane) comprises carbonate units derived from bisphenol A, and repeating siloxane units (5a), (5b), (7a), (7b), (7c), or a combination comprising at least one of the foregoing (preferably of formula 7a), wherein E has an average value of E has an average value of 30 to 100, preferably 30 to 60, more preferably 30 to 50 or 40 to 50.

The poly(carbonate-siloxane) can have a siloxane content of 10 to 30 wt %, or 15 to 30 wt %, preferably 15 to 25 wt %, more preferably 17 to 23 wt %, each based on the total weight of the poly(carbonate-siloxane). As used herein, "siloxane content" of a poly(carbonate-siloxane) refers to the content of siloxane units based on the total weight of the polysiloxane-polycarbonate copolymer. The poly(carbonate-siloxane) can have a weight average molecular weight of 28,000 to 32,000 Da, preferably 29,000 to 31,000 Da as measured by gel permeation chromatography using a cross-linked styrene-divinyl benzene column, at a sample concentration of 1 milligram per milliliter, and as calibrated with bisphenol A polycarbonate standards.

The poly(carbonate-siloxane) can be present in an amount effective to provide 2.5 to 10 wt %, preferably 2.5 to 5 wt % of siloxane units based on the total weight of the polycarbonate composition.

In an embodiment, the poly(carbonate-siloxane) can be present in the polycarbonate compositions in an amount of 12 to 25 wt %, 12 to 20 wt %, 15 to 20 wt %, 12 to 18 wt %, or 14 to 18 wt %, based on the total weight of the compositions.

The polycarbonate compositions further include an elastomer-modified graft copolymer. Suitable elastomer-modified graft copolymers comprise (i) an elastomeric (i.e., rubbery) polymer substrate having a Tg less than 10° C., more specifically less than −10° C., or more specifically −40 to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific elastomer-modified graft copolymers include those formed from styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), or a combination comprising at least one of the foregoing. Preferably, the elastomer-modified graft copolymer comprises acrylonitrile-butadiene-styrene (ABS).

Elastomer-modified graft copolymer can also include a silicone graft copolymer. As used herein, a silicone graft copolymer can be a silicon core-shell graft copolymer prepared by grafting ethylenically unsaturated monomers onto a rubbery silicone core, thus forming a rigid shell. In an embodiment, the silicone graft copolymer comprises a core comprising a polydiorganosiloxane and a vinyl-based monomer graft copolymerized with the core to form a shell. Methods for preparing the silicone core-shell graft copolymers are known in the art. For example, silicone core-shell graft copolymers can be prepared by methods disclosed in U.S. Pat. No. 7,615,594, or in Abele et al., "Silicone Based Flame Retardant for Polycarbonate," ANTEC, 2009, pp. 1351-1354.

The ethylenically unsaturated monomers used to form the shell are generally a combination of a monofunctional monomer and a copolymerizable polyfunctional monomer. Examples of monofunctional monomers include styrene, α-methylstyrene, halogen or $C_{1-3}$ alkyl substituted styrene, acrylonitrile, methacrylonitrile, maleic acid, maleic anhydride, $C_{1-4}$ alkyl and phenyl N-substituted maleimide, $C_{1-8}$ alkyl methacrylates, $C_{1-8}$ alkyl acrylates, and the like. Example of copolymerizable polyfunctional monomers include allyl methacrylate, triallyl cyanurate, triallyl isocyanurate, diallyl phthalate, ethylene glycol dimethacrylate, 1,3-butylene glycol dimethacrylate, divinyl benzene, and the like. Preferred monomers are the $C_{1-8}$ alkyl methacrylates, $C_{1-8}$ alkyl acrylates, more specifically $C_{1-6}$ alkyl methacrylates.

The rubbery silicone core can be prepared by polymerization of a cyclosiloxane in the presence of a curing agent to produce particles. The particles can have an average diameter of 0.1 to 1 micrometer. Examples of cyclosiloxanes include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like. Examples of curing agents include reactive silanes, for example trimethoxymethylsilane, tetramethoxysilane, tetraethoxysilane, and the like. The silicone core can comprise 20 to 100 wt % of silicone, or 30 to 95 wt % of silicone, with the remainder of the core being rubber groups.

The rubber content of the silicone-based core-shell graft copolymer can be in the range of 30 to 90% by weight. In some embodiments, the silicone core-shell graft copolymer comprises more than 70 wt %, or 60 to 80 wt %, or 60 to 70 wt %, or 65 to 75 wt % of the silicone core component, wherein the graft shell component is derived from primarily $C_{1-6}$ alkyl methacrylates. A commercially available silicone core-shell graft copolymer is sold under the tradename KANE ACE MR-01 by Kaneka Corporation (Japan).

Elastomer-modified graft copolymers can be present in amounts of 1 to 8 wt % or 2 to 7 wt %, based on the total weight of the polycarbonate compositions.

The polycarbonate compositions can have good impact properties when certain silicone oils are present. Silicone oils are generally free of reactive groups such as alkenyl groups, silicon-bonded hydrogen atoms, silanol groups, silicon-bonded hydrolyzable groups, and amine groups. The silicone oils are fluid at 25° C. Exemplary silicone oils have a viscosity of 1 to 5,000 centistokes, specifically 100 to 2,500 centistokes, more specifically 500 to 1,500 centistokes, all at 25° C.

Silicone oils can be a polydialkylsiloxane, a polydiphenylsiloxane, a poly(alkylphenyl siloxane), a copolymer thereof, or a combination comprising at least one of the foregoing. The alkyl groups can be the same or different and can have 1 to 10 carbon atoms, 1 to 6 carbon atoms, 1 to 3 carbon atoms, or 1 carbon atom. The silicone oils can have both alkyl groups and phenyl groups attached to the silicon atoms. The phenyl groups can be provided by alkylphenyl units or diphenyl units, or a combination thereof. The silicone oils can have a phenyl content of 40 to 60 mol %. As used herein, a phenyl content refers the mole % of phenyl groups attached to silicon atoms based on the sum of the moles of the phenyl and alkyl groups attached to the silicon atoms in the silicone oil. Preferably, the silicone oil has 40 to 60 mol % of methyl groups attached to silicon atoms and 60 to 40 mol % of phenyl groups attached to silicon atoms, each based on the total moles of the methyl groups and phenyl groups attached to silicon atoms. In an embodiment, the silicone oil is a poly(methylphenylsiloxane), for example a poly(methylphenylsiloxane) having a viscosity from 50 to 1,000 mPa-s at 25° C.

Silicone oils can be present in amounts of 0.01 to 5 wt % or 0.1 to 1 wt %, based on the total weight of the polycarbonate compositions.

In addition to the polycarbonate homopolymer, the poly(siloxane-carbonate)s, the elastomer-modified graft copolymers, and the silicone oil, the polycarbonate compositions can optionally include various additives ordinarily incorporated into polymer compositions of this type, with the proviso that the additive(s) are selected so as to not significantly adversely affect the desired properties of the polycarbonate compositions, in particular impact, flow, chemical resistance, and aesthetics. Additives include fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives can be used, for example a combination of a heat stabilizer, mold release agent, ultraviolet light stabilizer, and flame retardant. In general, the additives are used in the amounts known to be effective. In an embodiment, the polycarbonate compositions comprise no more than 8 wt %, for example 0.01 to 8 wt %, 0.1 to 8 wt %, 0.5 to 8 wt %, 5 to 8 wt %, or 0.1 to 1 wt % based on the weight of the polycarbonate compositions of a processing aid, a heat stabilizer, an antioxidant, an ultra violet light absorber, a flame retardant, or a combination comprising at least one of the foregoing.

In an embodiment, the polycarbonate compositions comprise, based on the total weight of the polycarbonate compositions, less than 10 wt %, less than 5 wt %, or less than 2 wt % of reinforcing mineral fillers such as mica, clay (kaolin), talc, wollastonite, calcium carbonates (such as chalk, limestone, marble, and synthetic precipitated calcium carbonates), barium ferrite, heavy spar, and the like. In a specific embodiment, the polycarbonate compositions are free of such reinforcing mineral fillers.

The polycarbonate compositions can optionally include a colorant composition containing pigment and/or dye additives. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments.

Dyes can be organic materials and include coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly $(C_{2-8})$ olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes.

In an embodiment, the polycarbonate compositions comprise up to 8 wt % of titanium dioxide, carbon black, an inorganic pigment, an organic pigment, a dye, or a combination comprising at least one of the foregoing, based on the total weight of the compositions.

The polycarbonate compositions can be free of flame retardants. Alternatively, the polycarbonate compositions can optionally include flame retardants. Diverse types of flame retardants can be utilized. In one embodiment, the flame retardant additives include, salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In an embodiment, the compositions disclosed herein are free of aromatic sulfonates and aromatic sulfone sulfonates.

Organophosphorus flame retardants can be used. Organophosphorus compounds include aromatic organophosphorus compounds having at least one organic aromatic group and at least one phosphorus-containing group, as well as organic compounds having at least one phosphorus-nitrogen bond. The polycarbonate compositions disclosed herein can contain 1 to 8 wt % or 3 to 8 wt % or 5 to 8 wt % of the organophosphorus flame retardants, based on the total weight of the polycarbonate compositions.

In the aromatic organophosphorus compounds that have at least one organic aromatic group, the aromatic group can be a substituted or unsubstituted $C_{3-30}$ group containing one or more of a monocyclic or polycyclic aromatic moiety (which can optionally contain with up to three heteroatoms (N, O, P, S, or Si)) and optionally further containing one or more nonaromatic moieties, for example alkyl, alkenyl, alkynyl, or cycloalkyl. The aromatic moiety of the aromatic group can be directly bonded to the phosphorus-containing group, or bonded via another moiety, for example an alkylene group. The aromatic moiety of the aromatic group can be directly bonded to the phosphorus-containing group, or bonded via another moiety, for example an alkylene group. In an embodiment the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The phosphorus-containing group can be a phosphate ($P(=O)(OR)_3$), phosphite ($P(OR)_3$), phosphonate ($RP(=O)(OR)_2$), phosphinate ($R_2P(=O)(OR)$), phosphine oxide ($R_3P(=O)$), or phosphine ($R_3P$), wherein each R in the foregoing phosphorus-containing groups can be the same or different, provided that at least one R is an aromatic group. A combination of different phosphorus-containing groups can be used. The aromatic group can be directly or indirectly bonded to the phosphorus, or to an oxygen of the phosphorus-containing group (i.e., an ester).

In an embodiment the aromatic organophosphorus compound is a monomeric phosphate. Representative monomeric aromatic phosphates are of the formula $(GO)_3P=O$, wherein each G is independently an alkyl, cycloalkyl, aryl, alkylarylene, or arylalkylene group having up to 30 carbon atoms, provided that at least one G is an aromatic group. Two of the G groups can be joined together to provide a cyclic group. In some embodiments G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic organophosphorus compounds are also useful, for example, compounds of the formulas

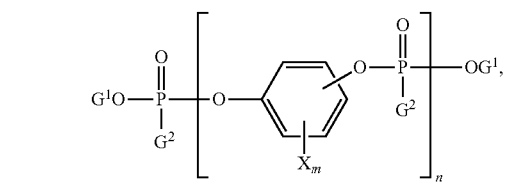

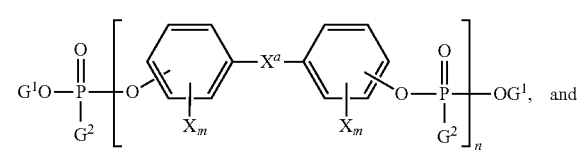

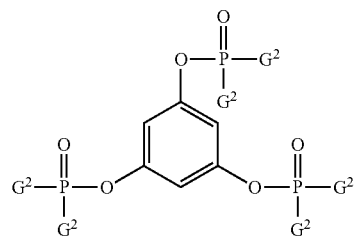

wherein each $G^1$ is independently a $C_{1-30}$ hydrocarbyl; each $G^2$ is independently a $C_{1-30}$ hydrocarbyl or hydrocarbyloxy; $X^a$ is as defined in formula (3) or formula (4); each X is independently a bromine or chlorine; m is 0 to 4, and n is 1 to 30. In a specific embodiment, $X^a$ is a single bond, methylene, isopropylidene, or 3,3,5-trimethylcyclohexylidene.

Specific aromatic organophosphorus compounds are inclusive of acid esters of formula (9)

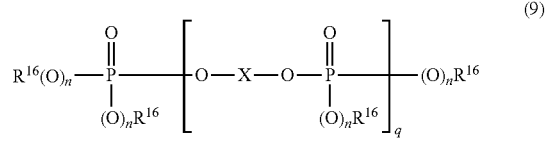

(9)

wherein each $R^{16}$ is independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which can be OH-substituted and can contain up to 8 ether bonds, provided that at least one $R^{16}$ or X is an aromatic group; each n is independently 0 or 1; and q is from 0.5 to 30. In some embodiments each $R^{16}$ is independently $C_{1-4}$ alkyl, naphthyl, phenyl $(C_{1-4})$alkylene, aryl groups optionally substituted by $C_{1-4}$ alkyl; each X is a mono- or poly-nuclear aromatic $C_{6-30}$ moiety, each n is 1; and q is from 0.5 to 30. In some embodiments each $R^{16}$ is aromatic, e.g., phenyl; each X is a mono- or poly-nuclear aromatic $C_{6-30}$ moiety, including a moiety derived from formula (2); n is one; and q is from 0.8 to 15. In other embodiments, each $R^{16}$ is phenyl; X is cresyl, xylenyl, propylphenyl, or butylphenyl, one of the following divalent groups

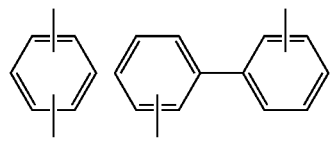

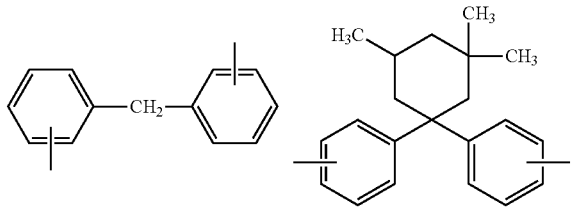

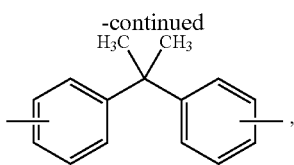

or a combination comprising one or more of the foregoing; n is 1; and q is from 1 to 5, or from 1 to 2. In some embodiments at least one $R^{16}$ or X corresponds to a monomer used to form the polycarbonate, e.g., bisphenol A, resorcinol, or the like. Aromatic organophosphorus compounds of this type include the bis(diphenyl) phosphate of hydroquinone, resorcinol bis(diphenyl phosphate) (RDP), and bisphenol A bis(diphenyl) phosphate (BPADP), and their oligomeric and polymeric counterparts.

The organophosphorus flame retardant containing a phosphorus-nitrogen bond can be a phosphazene, phosphonitrilic chloride, phosphorus ester amide, phosphoric acid amide, phosphonic acid amide, phosphinic acid amide, or tris (aziridinyl) phosphine oxide. These flame-retardant additives are commercially available. In an embodiment, the organophosphorus flame retardant containing a phosphorus-nitrogen bond is a phosphazene or cyclic phosphazene of the formulas

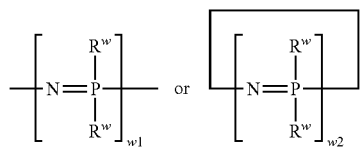

wherein w1 is 3 to 10,000; w2 is 3 to 25, or 3 to 7; and each $R^w$ is independently a $C_{1-12}$ alkyl, alkenyl, alkoxy, aryl, aryloxy, or polyoxyalkylene group. In the foregoing groups at least one hydrogen atom of these groups can be substituted with a group having an N, S, O, or F atom, or an amino group. For example, each $R^w$ can be a substituted or unsubstituted phenoxy, an amino, or a polyoxyalkylene group. Any given $R^w$ can further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. In an embodiment, the phosphazene has a structure represented by the formula

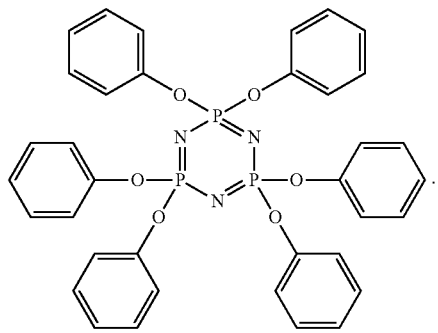 [SMILES: c1ccc(OP2(Oc3ccccc3)=NP(Oc3ccccc3)(Oc3ccccc3)=NP(Oc3ccccc3)(Oc3ccccc3)=N2)cc1]

Commercially available phenoxyphosphazenes having the aforementioned structures are LY202 manufactured and distributed by Lanyin Chemical Co., Ltd, FP-110 manufactured and distributed by Fushimi Pharmaceutical Co., Ltd, and SPB-100 manufactured and distributed by Otsuka Chemical Co., Ltd.

Specifically mentioned flame retardants include potassium diphenylsulfone sulfonate, sodium toluene sulfonate, potassium perfluorobutane sulphonate, bisphenol A bis(diphenyl phosphate), resorcinol bis(diphenyl phosphate), phenoxyphosphazene, or a combination comprising at least one of the foregoing.

The polycarbonate compositions can optionally comprise anti-drip agents. The anti-drip agent can be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer.

The polycarbonate compositions can have good impact properties in particular Izod notched impact and ductility. In an embodiment, the compositions have an Izod notched impact energy of at least 700 J/m, at least 720 J/m, or at least 740 J/m, measured at 23° C. on a sample of 3.2 mm thickness according to ASTM D256-10.

The polycarbonate compositions can further have good melt viscosities, which aid processing. The polycarbonate compositions have a melt mass flow rate greater than 16 g/10 min, for example greater than 16 g/10 min to less than 25 g/10 min, determined in accordance with ASTM D1238 under a load of 1.2 kg at 300° C. with a dwelling time of 300 seconds.

The polycarbonate compositions can have a heat deflection temperature of 100° C. or higher as measured on a sample plaque of 3.2 mm thickness at 1.82 MPa according to ASTM D648.

The polycarbonate compositions can be manufactured by various methods known in the art. For example, powdered polycarbonate homopolymer, poly(carbonate-siloxane), elastomer-modified graft copolymer, silicone oil, and other optional components are first blended, in a high-speed mixer or by hand mixing. The blend is then fed into the throat of a twin-screw extruder via a hopper. Alternatively, at least one of the components can be incorporated into the composition by feeding it directly into the extruder at the throat and/or downstream through a side stuffer, or by being compounded into a master batch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Shaped, formed, casted, or molded articles comprising the polycarbonate compositions are also provided. The polycarbonate compositions can be molded into useful shaped articles by a variety of methods, such as injection molding, extrusion, rotational molding, blow molding, and thermoforming. The article can be a molded article, a thermoformed article, an extruded film, an extruded sheet, a honeycomb structure, one or more layers of a multi-layer article, a substrate for a coated article, and a substrate for a metallized article.

In an embodiment, a molded article is disclosed, comprising a decorative film bonded to an injection molded base structure formed from the polycarbonate compositions. The decorative film can have a thickness of less than 0.06 mm, less than 0.05 mm, or less than 0.03 mm. The decorative film can be a multilayer sheet having a base layer and a decorative layer such as a print. The film may be prepared through various processes. For example, the base layer can be prepared by extrusion, calendaring, or other related processes, while the decorative layer can be made by a coating or deposition process. The base layer has sufficient structural integrity to act as a support or carrier for the decorative layer. The decorative layer, which will become part of the final product, is a very thin layer, e.g., less than or equal to 0.05 mm thick, specifically, less than or equal to 0.03 mm thick, more specifically, less than or equal to 0.01 mm thick, e.g., a 0.005 to 0.01 mm thick. The base layer can comprise, for example, polyethylene terephthalate (PET) or another polymer, while the decorative layer can be any material compatible with the molding material and that is desired for the surface of the molded product, e.g., the material can be polymeric, metallic, or a combination comprising at least one of the foregoing. The decorative film can be cold formed or thermoformed into a three-dimensional shape matching the three-dimensional shape of the injection molded base structure.

Also disclosed herein is a method of molding an article, comprising placing the above-described decorative film into a mold, and injecting a polycarbonate composition into the mold cavity space behind the decorative film, to form a single molded article comprising the decorative film and an injection molded base structure formed from the polycarbonate composition. According to an exemplary embodiment, molded articles are prepared by: printing a decoration on a surface of a base layer or a multilayer sheet (specifically on the exposed surface of the base layer), for example by screen printing to form a decorative film; forming and optionally trimming the decorative film into a three-dimensional shape; fitting the decorative film into a mold having a surface which matches the three-dimensional shape of the decorative film; and injecting a polycarbonate composition as disclosed herein, into the mold cavity behind the decorative film to produce a one-piece, permanently bonded three-dimensional article or product.

The decoration for the finished article or product can either be exposed to the environment ("first surface decoration") and/or encapsulated between the decorated film and the injected material ("second surface decoration").

For in-mold decoration (IMD) processes, high temperature, formable inks can be used for graphics application. Second surface decoration can employ more robust ink systems to provide adequate ink adhesion during the molding process. Once the ink is printed, it can be either dried or cured depending on the ink technology used. If the ink is solvent or water based, then a gas-fired or electric dryer can be used to dry the ink.

The molded articles have excellent aesthetic properties. In an embodiment, a molded article comprising the polycarbonate compositions has reduced aesthetic defects, such as ink washout, black streaking, knitline visibility, gate blush, or pearlescence. In particular, the molded articles can be free of surface defects visible to the unaided eye with normal vision (over an area of greater than or equal to 600 $mm^2$), and free of washout.

In some embodiments, the article can be a component of a consumer electronic device such as a gaming console, a gaming controller, a portable gaming device, a cellular telephone, a television, a personal computer, a tablet computer, a laptop computer, a personal digital assistant, a portable media player, a digital camera, a portable music player, an appliance, a power tool, a robot, a toy, a greeting card, a home entertainment system, a loudspeaker, or a sound bar.

In some embodiments, the article can be an electronic housing for an adapter, a cell phone, a smart phone, a GPS device, a laptop computer, a tablet computer, an e-reader, a copier, or a solar apparatus.

The above described and other features are exemplified by the following examples. In the examples, unless otherwise specified, the percent (%) of the components is weight percent based on the total weight of the composition.

EXAMPLES

Materials.

The materials used in the Examples are described in Table 1.

TABLE 1

| Component | Chemical Description | Source |
|---|---|---|
| PC1 | Linear Bisphenol A Polycarbonate homopolymer, produced via interfacial polymerization, Mw of about 29,900 g/mol as determined by GPC using bisphenol A polycarbonate standards, p-cumylphenol end-capped | SABIC |
| PC2 | Linear Bisphenol A Polycarbonate homopolymer, produced via interfacial polymerization, Mw of about 18,200 g/mol as determined by GPC using bisphenol A polycarbonate standards, p-cumylphenol end-capped | SABIC |
| PC3 | Linear Bisphenol A Polycarbonate homopolymer, produced via interfacial polymerization, Mw of about 21,900 g/mol as determined by GPC using bisphenol A polycarbonate standards, p-cumylphenol end-capped | SABIC |
| SiPC | PDMS (polydimethylsiloxane) - Bisphenol A Polycarbonate copolymer, 20 wt. % siloxane, average PDMS block length of 45 units (D45), Mw about 30,000 g/mol as determined by GPC using bisphenol A polycarbonate standards, p-cumylphenol end-capped | SABIC |

TABLE 1-continued

| Component | Chemical Description | Source |
|---|---|---|
| Silicone oil | Poly (methylphenyl siloxane) | MOMENTIVE |
| ABS | Acrylonitrile-butadiene-styrene | KUMHO PETRO-CHEMICAL |
| BPADP | Bisphenol A bis (diphenyl phosphate) | NAGASE |
| DPP | Diphenoxy phosphazene (13% P) (SPB-100) | Otsuka Chemicals |
| TSAN | Styrene-acrylonitrile copolymer encapsulated PTFE | SABIC |
| AO1 | Octadecyl-3-(3,5-di-tert-butyl-4-hydroxyphenyl) propionate | CIBA |
| AO2 | Tris(2,4-di-tert-butylphenyl)phosphite (IRGAFOS-168) | CIBA |
| AO3 | Pentaerythritol tetrakis/3-laurylthiopropionate) | Asahi |
| PETS | Pentaerythritol tetrastearate | Faci |

Blending, Extrusion, and Molding Conditions.

The compositions were prepared by pre-blending all constituents in a dry-blend and tumble mixed for 15 minutes. The pre-blend was fed directly to a co-rotation twin screw extruder operated under standard processing conditions well known to one skilled in the art. The organic phosphorus flame retardant component (e.g. BPADP) was added to the middle part of the extruder from a liquid feed pump. The composition was then melt-kneaded and extruded. The extrudate was pelletized and dried in a dehumidifying dryer at about 110° C. for about 3 hours. To make test specimens, the dried pellets were injection molded in an ENGEL molding machine to form appropriate test samples.

Testing Methods.

The ASTM tests performed are summarized in Table 2.

TABLE 2

| Description | Test standards | Testing Conditions |
|---|---|---|
| Melt Mass-flow Rate (MFR) | ASTMD 1238 | 300° C., 1.2 Kg, 300 s or 260° C., 2.16 Kg, 300 s |
| Tensile | ASTMD 638 | 50 mm/min |
| Notched Izod Impact (INI) | ASTMD 256 | 5 lbf/ft, 23° C., 3.2 mm |
| Heat deflection temperature (HDT) | ASTMD 648 | 1.82 MPa, 3.2 mm |
| Flexural modulus | ASTMD 790 | 1.27 mm/min |

A decorative film having ink patterns was placed in a mold. A polycarbonate composition was injected into a mold cavity behind the decorative film. The decorative film and the polycarbonate composition were molded together forming a molded sample. Ink washout was determined by visual inspection. The results were reported as "pass" for samples without ink washout or "fail" for samples having ink washout defects.

Roller test performance was evaluated using a molded mobile phone part. A roller with a length of one meter and a diameter of 0.75 meter rolled over the mobile phone part under a load of 150 g. After 100 cycles, the mobile phone was inspected for cracks. A rating of 1 to 5 was given for each part with a rating of 1 representing the worst impact performance and a rating of 5 representing the best impact performance.

Examples 1-7

Exemplary compositions of the disclosure (Ex5 and Ex7), along with control or comparative compositions (CEx1-CEx 4 and CEx6), were tested for impact, flow, heat deflection temperature, and ink washout performance. The formulations and the results are shown in Table 3.

TABLE 3

| Component | Unit | CEx 1 | CEx 2 | CEx 3 | CEx 4 | Ex 5 | CEx 6 | Ex 7 |
|---|---|---|---|---|---|---|---|---|
| PC1 | wt % | 21.49 | 5 | | | | 5.98 | 5.98 |
| PC2 | wt % | | | 2 | | | | |
| PC3 | wt % | 53.5 | 68.29 | 70.29 | 70.09 | 69.59 | 75.36 | 74.86 |
| SiPC | wt % | 15.8 | 17 | 17 | 17 | 17 | 13 | 15 |
| ABS | wt % | 1.5 | 2 | 3 | 5 | 5 | 5 | 5 |
| Silicone oil | wt % | | | | | 0.5 | | 0.5 |
| BPADP | wt % | 5 | 6 | 6 | 5 | 5 | | |
| DPP | wt % | 1 | | | 1 | 1 | | |
| Anti-dripping | wt % | 0.75 | 0.75 | 0.75 | 0.75 | 0.75 | | |
| AO-1 | wt % | 0.08 | 0.08 | 0.08 | 0.08 | 0.08 | 0.08 | 0.08 |
| AO-2 | wt % | 0.08 | 0.08 | 0.08 | 0.08 | 0.08 | 0.08 | 0.08 |
| AO-3 | wt % | | | | | 0.2 | 0.2 | 0.2 |
| PETS | wt % | 0.3 | 0.3 | 0.3 | 0.3 | 0.3 | 0.3 | 0.3 |
| MFR (300° C., 1.2 kg) | g/10 min | 14.6 | 21 | 24.2 | 19.6 | 20 | 19.5 | 18 |
| INI at 23° C. | J/m | 809 | 708 | 686 | 688 | 747 | 760 | 770 |
| Tensile modulus | MPa | 2297 | 2330 | 2360 | 2247 | 2273 | 2280 | 2220 |
| Tensile strength | MPa | 62.4 | 61.2 | 61 | 57.5 | 57.9 | 62.4 | 55.8 |
| Tensile elongation at break | % | 104.8 | 110 | 71 | 110 | 93.5 | 140 | 102.6 |
| Flexural strength at yield | MPa | 94.6 | 96.5 | 96.3 | 91.7 | 93 | 88.8 | 90.7 |
| Flexural modulus | MPa | 2280 | 2350 | 2370 | 2200 | 2250 | 2210 | 2320 |
| HDT | ° C. | 109.1 | 102.5 | 100.9 | 102.5 | 101.2 | 116.2 | 119.3 |
| Ink washout performance | — | Fail | Fail | Pass | Pass | Pass | Pass | Pass |
| Roller test | — | 5 | 4 | 2 | 3 | 5 | 4 | 5 |

The results show that CEx 1 has good impact properties but poor flow, and a molded part of the composition has ink washout defects. CEx 2 has good flow but a molded sample still has ink washout issues. In addition, the roller test result of CEx 2 is less than desirable. CEx 3 has a further improved flow, and a mold sample does not have ink washout defects, but the impact properties have been compromised with CEx 3 having the worst roller test result among all the tested samples. CEx 4 and CEx 6 do not have ink washout issues but the roller test results are less than desirable with a roller test rating of 3 and 4 respectively for CEx 4 and CEx 6. Surprisingly, when 0.5 wt % of a silicone oil is added to the compositions of Ex 5 and Ex 7, the ink washout performance remains the same yet the impact properties have been improved with the roller test rating improved from 3 or 4 to 5.

Further included in this disclosure are the following specific aspects, which do not necessarily limit the claims.

Aspect 1. A polycarbonate composition comprising, based on the total weight of the polycarbonate composition: one or more polycarbonate homopolymers; a poly(carbonate-siloxane) copolymer comprising siloxane units with an average block length of 5 to 120, preferably 10 to 100, the poly(carbonate-siloxane) copolymer being present in an amount effective to provide 2.5 to 10 wt %, preferably 2.5 to 5 wt % of siloxane units based on the total weight of the polycarbonate composition; 1 to 8 wt % of an elastomer-modified graft copolymer comprising a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, methyl methacrylate-butadiene-styrene, a silicone graft copolymer, or a combination comprising at least one of the foregoing; 0.01 to 5 wt % of a silicone oil comprising a polydialkylsiloxane, a polydiphenylsiloxane, a poly(alkylphenyl siloxane), a copolymer thereof, or a combination comprising at least one of the foregoing; and 0.1 to 8 wt % of an additive comprising a processing aid, a heat stabilizer, an antioxidant, an ultra violet light absorber, a flame retardant, an anti-drip agent, or a combination comprising at least one of the foregoing; and wherein the composition has a melt mass flow rate higher than 16 g/10 min, determined in accordance with ASTM D1238 under a load of 1.2 kg at 300° C. with a dwelling time of 300 seconds; and an Izod notched impact energy of at least 700 J/m measured at 23° C. on a sample of 3.2 mm thickness according to ASTM D256-10.

Aspect 2. A polycarbonate composition comprising, based on the total weight of the polycarbonate composition: 50 to 85 wt % of one or more polycarbonate homopolymers; 12 to 25 wt % of a poly(carbonate-siloxane) copolymer comprising siloxane units with an average block length of 30 to 100, and a siloxane content of 15 to 30 wt % based on the total weight of the poly(carbonate-siloxane); 1 to 8 wt % of an elastomer-modified graft copolymer comprising a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, methyl methacrylate-butadiene-styrene, a silicone graft copolymer, or a combination comprising at least one of the foregoing; 0.01 to 5 wt % of a silicone oil comprising a polydialkylsiloxane, a polydiphenylsiloxane, a poly(alkylphenyl siloxane), a copolymer thereof, or a combination comprising at least one of the foregoing; and 0.1 to 8 wt % of an additive comprising a processing aid, a heat stabilizer, an antioxidant, an ultra violet light absorber, a flame retardant, an anti-drip agent, or a combination comprising at least one of the foregoing; and wherein the composition has a melt mass flow rate higher than 16 g/10 min, determined in accordance with ASTM D1238 under a load of 1.2 kg at 300° C. with a dwelling time of 300 seconds; and an Izod notched impact energy of at least 700 J/m measured at 23° C. on a sample of 3.2 mm thickness according to ASTM D256-10.

Aspect 3. The polycarbonate composition of any one or more of Aspects 1 to 2, wherein the elastomer-modified graft copolymer comprises acrylonitrile-butadiene-styrene.

Aspect 4. The polycarbonate composition of any one or more of Aspects 1 to 3, wherein the silicone oil is a poly(methylphenylsiloxane).

Aspect 5. The polycarbonate composition of any one or more of Aspects 1 to 4, wherein the silicone oil has 40 to 60 mol % of methyl groups attached to silicon atoms and 60 to 40 mol % of phenyl groups attached to silicon atoms, each based on the total moles of the methyl groups and phenyl groups attached to silicon atoms.

Aspect 6. The polycarbonate composition of any one or more of Aspects 1 to 5, wherein the silicone oil is present in an amount of 0.1 to 1 wt %, based on the total weight of the polycarbonate composition.

Aspect 7. The polycarbonate composition of any one or more of Aspects 1 to 6, wherein the polycarbonate homopolymer is present in an amount of 65 to 85 wt % based on the total weight of the polycarbonate composition.

Aspect 8. The polycarbonate composition of any one or more of Aspects 1 to 6, wherein the polycarbonate homopolymer comprises a bisphenol A homopolycarbonate.

Aspect 9. The polycarbonate composition of any one or more of Aspects 1 to 7, wherein the poly(carbonate-siloxane) comprises bisphenol A carbonate units and siloxane units of the formula

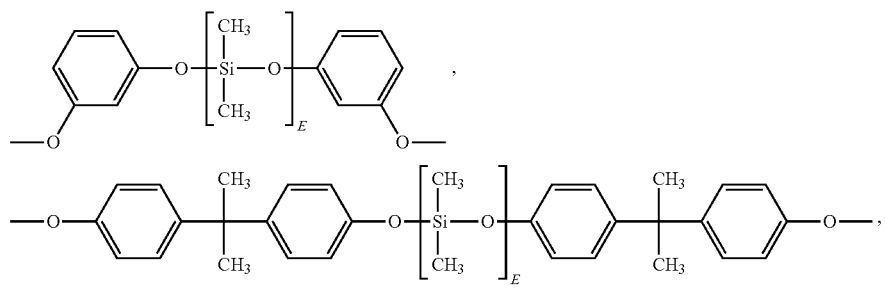

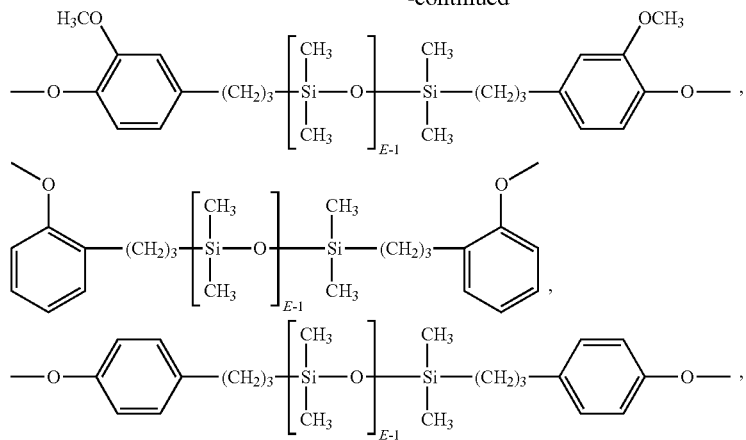

or a combination comprising at least one of the foregoing, wherein E has an average value of 30 to 100.

Aspect 10. The polycarbonate composition of any one or more of Aspects 1 to 9, wherein the poly(carbonate-siloxane) comprises bisphenol A carbonate units and siloxane units of the formula

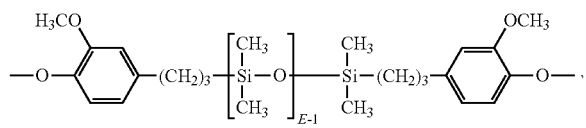

wherein E has an average value of 30 to 80, or 30 to 70, or 40 to 50.

Aspect 11. The polycarbonate composition of any one or more of Aspects 1 to 10, comprising, based on the total weight of the composition: 65 to 75 wt % of the one or more bisphenol A polycarbonate homopolymers; 15 to 20 wt % of the poly(carbonate-siloxane), preferably the poly(carbonate-siloxane) comprising bisphenol A carbonate units and siloxane units of the formula

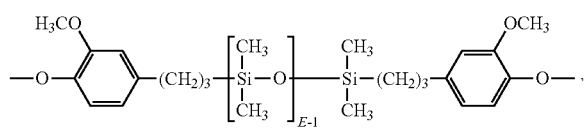

wherein E has an average value of 20 to 80, 30 to 70, or 40 to 50; 2 to 7 wt % of the elastomer-modified graft copolymer which comprises acrylonitrile-butadiene-styrene; 0.1 to 1 wt % of a poly(methylphenylsiloxane); and 5 wt % to 8 wt % of the additive.

Aspect 12. The polycarbonate composition of any one or more of Aspects 1 to 11, comprising, based on the total weight of the composition: 75 to 85 wt % of the one or more bisphenol A polycarbonate homopolymers; 12 to 18 wt % of the poly(carbonate-siloxane), preferably the poly(carbonate-siloxane) comprising bisphenol A carbonate units and siloxane units of the formula

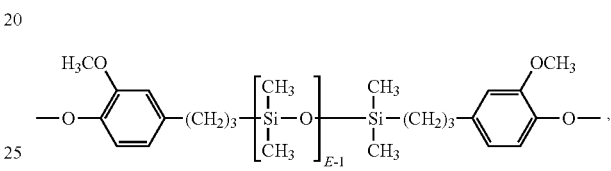

wherein E has an average value of 20 to 80, 30 to 70, or 40 to 50; 2 to 7 wt % of the elastomer-modified graft copolymer which comprises acrylonitrile-butadiene-styrene; 0.1 to 1 wt % of a poly(methylphenylsiloxane); and 0.1 to 1 wt. % of the additive.

Aspect 13. The polycarbonate composition of any one or more of Aspects 1 to 12, comprising 1 to 8 wt % of an organophosphorus flame retardant.

Aspect 14. A molded article, comprising: a decorative film bonded to an injection molded base structure, the injection molded base structure comprising the polycarbonate composition of any one more of Aspects 1 to 13.

Aspect 15. A method of manufacture of an article, the method comprising placing a decorative film into a mold; injecting a polycarbonate composition of any one of Aspects 1 to 13 into a mold cavity space behind the decorative film to form a single molded article comprising the decorative film and an injection molded base structure comprising the polycarbonate composition.

The singular forms "a," "an," and "the" include plural referents unless the context clearly dictates otherwise. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

Unless otherwise specified herein, any reference to standards, regulations, testing methods and the like refers to the standard, regulation, guidance, or method that is in force as of Jan. 1, 2018.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polycarbonate composition comprising, based on the total weight of the polycarbonate composition:
   one or more polycarbonate homopolymers;
   a poly(carbonate-siloxane) copolymer comprising siloxane units with an average block length of 5 to 120, the poly(carbonate-siloxane) copolymer being present in an amount effective to provide 2.5 to 10 wt % of siloxane units based on the total weight of the polycarbonate composition;
   1 to 8 wt % of an elastomer-modified graft copolymer comprising the elastomer-modifier graft copolymer comprises a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, and methyl methacrylate-butadiene-styrene, a silicone graft copolymer, or a combination comprising at least one of the foregoing;
   0.01 to 5 wt % of a silicone oil comprising a polydiphenylsiloxane, a poly(alkylphenyl siloxane), a copolymer thereof, or a combination comprising at least one of the foregoing; and
   0.1 to 8 wt % of an additive comprising a processing aid, a heat stabilizer, an antioxidant, an ultra violet light absorber, a flame retardant, an anti-drip agent, or a combination comprising at least one of the foregoing; and
   wherein the composition has a melt mass flow rate higher than 16 g/10 min, determined in accordance with ASTM D1238 under a load of 1.2 kg at 300° C. with a dwelling time of 300 seconds; and
   an Izod notched impact energy of at least 700 J/m measured at 23° C. on a sample of 3.2 mm thickness according to ASTM D256-10.

2. The polycarbonate composition of claim 1, wherein the poly(carbonate-siloxane) copolymer comprises siloxane units with an average block length of 10 to 100, and the poly(carbonate-siloxane) copolymer is present in an amount effective to provide 2.5 to 5 wt % of siloxane units based on the total weight of the polycarbonate composition.

3. The polycarbonate composition of claim 1 comprising, based on the total weight of the polycarbonate composition:
   50 to 85 wt % of the one or more polycarbonate homopolymers;
   12 to 25 wt % of the poly(carbonate-siloxane) copolymer comprising
     siloxane units with an average block length of 30 to 100, and
     a siloxane content of 15 to 30 wt % based on the total weight of the poly(carbonate-siloxane);
   1 to 8 wt % of an elastomer-modified graft copolymer comprising the elastomer-modifier graft copolymer comprises a styrene-butadiene-styrene, styrene-butadiene rubber, styrene-ethylene-butadiene-styrene, acrylonitrile-butadiene-styrene, acrylonitrile-ethylene-propylene-diene-styrene, styrene-isoprene-styrene, and methyl methacrylate-butadiene-styrene, styrene-acrylonitrile, a silicone graft copolymer, or a combination comprising at least one of the foregoing;
   0.01 to 5 wt % of a silicone oil comprising a polydialkylsiloxane, a polydiphenylsiloxane, a poly(alkylphenyl siloxane), a copolymer thereof, or a combination comprising at least one of the foregoing; and
   0.1 to 8 wt % of an additive comprising a processing aid, a heat stabilizer, an antioxidant, an ultra violet light absorber, a flame retardant, an anti-drip agent, or a combination comprising at least one of the foregoing.

4. The polycarbonate composition of claim 1, wherein the elastomer-modified graft copolymer comprises acrylonitrile-butadiene-styrene.

5. The polycarbonate composition of claim 1, wherein the silicone oil is a poly(methylphenylsiloxane).

6. The polycarbonate composition of claim 1, wherein the silicone oil has 40 to 60 mol % of methyl groups attached to silicon atoms and 60 to 40 mol % of phenyl groups attached to silicon atoms, each based on the total moles of the methyl groups and phenyl groups attached to silicon atoms.

7. The polycarbonate composition of claim 1, wherein the silicone oil is present in an amount of 0.1 to 1 wt %, based on the total weight of the polycarbonate composition.

8. The polycarbonate composition of claim 1, wherein the polycarbonate homopolymer is present in an amount of 65 to 85 wt % based on the total weight of the polycarbonate composition.

9. The polycarbonate composition of claim 1, wherein the polycarbonate homopolymer comprises a bisphenol A homopolycarbonate.

10. The polycarbonate composition of claim 1, wherein the poly(carbonate-siloxane) comprises bisphenol A carbonate units and siloxane units of the formula

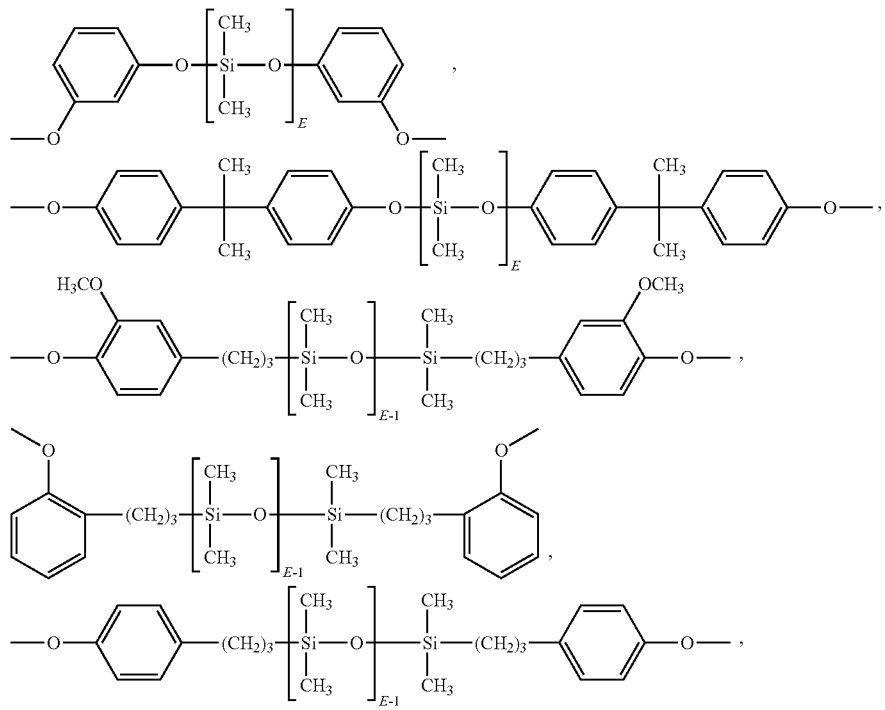

or a combination comprising at least one of the foregoing, wherein E has an average value of 30 to 100.

11. The polycarbonate composition of claim 1, wherein the poly(carbonate-siloxane) comprises bisphenol A carbonate units and siloxane units of the formula

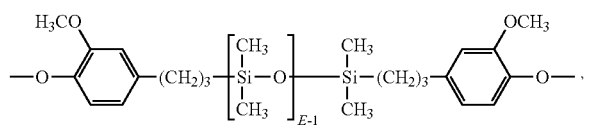

wherein E has an average value of 30 to 80.

12. The polycarbonate composition of claim 1, comprising, based on the total weight of the composition:
65 to 75 wt % of the one or more bisphenol A polycarbonate homopolymers;
15 to 20 wt % of the poly(carbonate-siloxane);
2 to 7 wt % of the elastomer-modified graft copolymer which comprises acrylonitrile-butadiene-styrene;
0.1 to 1 wt % of a poly(methylphenylsiloxane); and
5 to 8 wt % of the additive.

13. The polycarbonate composition of claim 1, wherein E has an average value of 30 to 70.

14. The polycarbonate composition of claim 1, comprising, based on the total weight of the composition:
75 to 85 wt % of the one or more bisphenol A polycarbonate homopolymers;
12 to 18 wt % of the poly(carbonate-siloxane);
2 to 7 wt % of the elastomer-modified graft copolymer which comprises acrylonitrile-butadiene-styrene;
0.1 to 1 wt % of a poly(methylphenylsiloxane); and
0.1 to 1 wt % of the additive.

15. The polycarbonate composition of claim 14, wherein the poly(carbonate-siloxane) comprises bisphenol A carbonate units and siloxane units of the formula

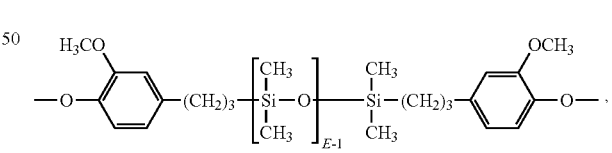

wherein E has an average value of 20 to 80.

16. The polycarbonate composition of claim 1, comprising 1 to 8 wt % of an organophosphorus flame retardant.

17. A molded article, comprising: a decorative film bonded to an injection molded base structure, the injection molded base structure comprising the polycarbonate composition of claim 1.

18. A method of manufacture of an article, the method comprising:
placing a decorative film into a mold;
injecting a polycarbonate composition of claim 1 into a mold cavity space behind the decorative film to form a single molded article comprising the decorative film and an injection molded base structure comprising the polycarbonate composition.

19. The polycarbonate composition of claim 11, wherein E has an average value of 30 to 70.

20. The polycarbonate composition of claim 11, wherein E has an average value of 40 to 50.

* * * * *